United States Patent

[11] 3,634,860

[72] Inventor Otto E. Rittenbach
 Neptune, N.J.
[21] Appl. No. 4,656
[22] Filed Jan. 21, 1970
[45] Patented Jan. 11, 1972
[73] Assignee The United States of America as
 represented by The Secretary of the Army

[54] DOPPLER RADAR WITH TARGET VELOCITY DIRECTION AND RANGE INDICATION, UTILIZING A VARIABLE-FREQUENCY GENERATOR
 3 Claims, 2 Drawing Figs.

[52] U.S. Cl. ................................................ 343/9,
 343/10, 343/12 R
[51] Int. Cl. ........................................... G01s 9/38,
 G01s 9/50
[50] Field of Search ............................. 343/9, 10, 12

[56] References Cited
UNITED STATES PATENTS
3,422,430 1/1969 Rittenbach ................... 343/9

Primary Examiner—Malcolm F. Hubler
Attorneys—Harry M. Saragovitz, Edward J. Kelly, Herbert Berl and Gordon W. Kerr ABSTRACT: The energy output from the CW oscillator of this radar is periodically phase shifted plus and minus 22.5° under the control of the output of a variable frequency square wave generator. The echo signals are combined with a sample of the transmitted signals and applied to a single mixer. A pair of Doppler signals are sequentially derived from the mixer output by means of a gate circuit operated by the square wave generator. At a certain generator frequency which depends on target range, the relative phases of the two Doppler signals will indicate the sense of direction of target movement. The generator frequency-adjusting means can be calibrated in terms of target range.

DOPPLER RADAR WITH TARGET VELOCITY DIRECTION AND RANGE INDICATION, UTILIZING A VARIABLE-FREQUENCY GENERATOR

The invention described herein may be manufactured, used, and licensed by or for The Government for governmental purposes without payment to me of any royalty thereon.

The present invention relates to Doppler radar and more particularly to a Doppler radar which is capable of indicating both target range and sense of target directivity, either toward or away from the radar set, utilizing novel circuitry. My U.S. Pat. No. 3,422,430 discloses and claims several types of Doppler radars with target radial velocity direction capability. It is explained therein that the target direction is determined by the relative phases of two Doppler signals derived from a pair of echo-related signals which differ in RF phase by 90°. The radar of the present invention also determines target direction by phase comparison of two Doppler signals, however the present circuitry for deriving the two properly phased echo-related signals differs from that of the cited patent, and in addition, a novel range measurement means utilizing a variable-frequency generator is included.

Briefly stated, the present circuitry includes a continuous wave (CW) oscillator, the output of which is periodically phase shifted by plus and minus 45° respectively under the control of a variable-frequency square wave generator to produce the transmitted signal. The square wave generator also operates a switch or gate connected to the output of the single mixer. The two gate outputs form the inputs to a pair of Doppler frequency channels. In operation, the frequency of the square wave generator is varied until one half the period thereof is equal to the round trip transit time to a target of interest. At this adjustment, the RF phase of the echo-related signal at the mixer input undergoes alternate 90° phase changes which are synchronized with the operation of the switch or gate to produce the two Doppler signals which determine target direction. The target range is inversely related to the square wave generator frequency.

It is thus an object of this invention to provide a Doppler radar set capable of measuring the sense of target directivity as well as range, utilizing novel and simple circuitry.

A further object of this invention is to provide a Doppler radar with target range and sense of direction capability utilizing a single mixer.

These and other objects and advantages of the invention will become apparent from the following detailed description and drawings, in which.

Figure 1:
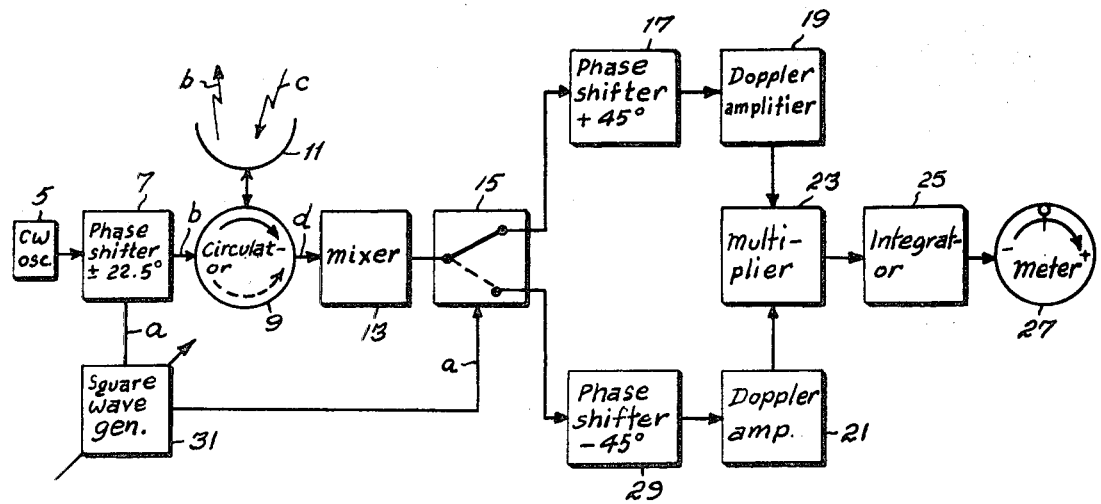
FIG. 1 is a block diagram of a preferred embodiment of the invention.

In the block diagram the radar transmitter comprises a continuous wave oscillator 5, the output of which is applied to the input of a controllable phase shifter 7. The control input to 7 is the output 'a' of variable-frequency square wave generator 31. The phase shifted signal 'b' then passes around the circulator 9 in the direction of easy energy flow, as indicated by the solid-line arrow therein, to antenna 11 to form the transmitted signal or beam 'b.' Target echoes 'c' are picked up by the antenna and applied to the input of mixer 13, together with a small amount of the transmitted signal which leaks around circulator 9 in the counterclockwise direction, as indicated by the dashed-line arrow therein. A double-output gate 15 is connected to the mixer output. The gate operation is controlled by the generator 31, such that at one level of generator 31, the mixer output is applied to the first Doppler channel comprising +45° phase shifter 17 and Doppler amplifier 19 and at the other level of generator 31 to the second Doppler channel comprising −45° phase shifter 29 and Doppler amplifier 21. The Doppler amplifiers may contain tuned circuits or other filters designed to pass only Doppler signals within a given velocity range of interest.

Figure 2:
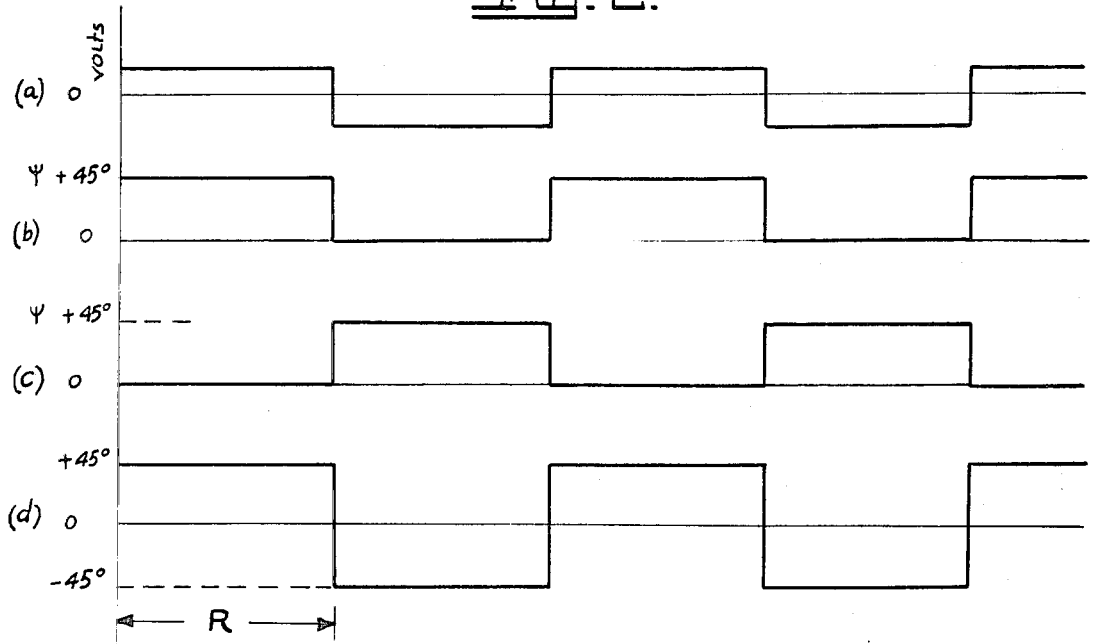
FIG. 2 is a series of waveforms illustrating the operation of the invention.

The mode of operation of this circuit will be apparent from the waveforms of FIG. 2. FIG. 2a shows the square wave output of generator 31. This is seen to comprise equal intervals at each of two levels. The controllable phase shifter 7 is arranged so that at the two levels of the generator 31, the phase shifter output differs in phase by 45°, for example the positive level of 31 may advance the phase of the output of oscillator 5 to +22.5° and the negative level thereof retard the phase thereof to −22.5° relative to a reference phase of zero, resulting in phase changes of 45° at each zero-crossing of the generator 31, as shown in waveform 2b. Thus FIG. 2b shows the phase characteristic of the transmitted signal. FIG. 2c shows the phase characteristic of an echo signal at such a range that the phase characteristic thereof is out-of-phase or reversed relative to that of the transmitted signal. This occurs if the round trip transit time of the target is equal to one half the period of the generator 31. It can be seen that corresponding phase transitions of 2c are displaced timewise by half the period of 31 relative to those of 2b. The target echo signal from such target and the circulator leakage undergo 90° phase changes relative to one another at the frequency of generator 31 as shown in FIG. 2d. This results from the fact that the target echo advances in phase by 45° at the same time that the circulator leakage is retarded by 45°, and vice versa, resulting in echo-related mixer input signals with combined phase characteristic as shown in FIG. 2d. Since the mixer output is synchronously switched to the two Doppler channels by the generator 31, the Doppler signals therein are sequentially derived from microwave signals which differ in phase by 90°.

The outputs of each of the Doppler amplifiers are applied to a multiplier 23 which in turn has its output connected to an integrator 25, which may comprise a simple low pass filter. A zero-center meter 27 is connected to the integrator output. The functions of the multiplier 23, integrator 25 and meter 27 may be combined in a wattmeter, as shown for example in my above-cited patent, in either FIGS. 3 or 4. The sense of deflection of the meter 27 indicates the sense of target direction along the radar beam, for example a negative meter deflection may indicate an incoming target and a positive deflection on outgoing target, or vice versa.

In operation, the frequency of the generator 31 is increased from its minimum setting until the phase relations depicted in FIG. 2 obtain. Such phase conditions occur when the meter 27 deflection is at a maximum, either in the positive or negative direction. The frequency changing means or knob of the generator 31 is then an indication of target range, and can be directly calibrated in terms of range rather than generator frequency. It should be noted that in this circuit the Doppler signals are not derived directly from the echo signals but are derived from the mixture of the superposed echo signal and circulator leakage. The mixed signal are called echo-related signals herein.

The gate or switch 15 may be purely electronic or electromechanical. For example, the output of the generator may operate the coil of a relay, the contacts of which would be used to perform the switching operation.

The present circuit accomplishes the same result as does the circuit in my copending application, Ser. No. 4665, filed Jan. 21, 1970, entitled "Doppler Radar with Target Velocity Direction and Range Indicator Utilizing Variable Delay Line," however the present invention utilizes different means for accomplishing this result.

While the invention has been described in connection with a specific illustrative embodiment, variations therein will occur to those skilled in the art without departing from the inventive concept herein disclosed.

What is claimed is:

1. A Doppler radar set with target directivity and range measurement capability, comprising, a continuous wave oscillator for generating the energy to be transmitted, a two-state plus and minus 22.5° phase shifter connected to the output of said oscillator, an adjustable frequency square wave generator connected to said phase shifter to periodically change the state of the phase shifter, means connected to the output of said phase shifter for transmitting the phase shifted energy to an antenna and to receive echoes of the transmitted energy and to provide an output of superimposed echoes of the transmitted signal and a sample of the transmitted signal, a mixer connected to the output of said means to derive a signal which changes phase by 90° at the frequency of said square wave generator, and a double-output gate connected to the output of said mixer and to said square wave generator for sequentially applying the two phases of the output of said mixer to a pair of Doppler channels respectively under the control of the output of said square wave generator.

2. In a Doppler radar set with target directivity and range measurement capability of the type that includes an antenna for emitting signal energy and for intercepting echoes of the emitted signal energy, a mixer, a double-output gate connected to the output of the mixer and having two operating states for delivering the mixer output alternately to a pair of Doppler channels, a circulator for transmitting signal energy to the antenna and to receive echoes of the transmitted signal and to deliver a sample of the transmitted signal and the signal echoes returned through the antenna to the input of the mixer, means for generating continuous wave signal energy, a phase shifter connected to the output of the signal generating means and coupling the signal energy to the circulator and having two operating states in which the respective signal energies delivered to the circulator have a fixed phase difference and means for shifting states of the phase shifter and of the double-output gate in a predetermined relationship, the improvement therein which comprises said state shifting means being operable to shift states of the phase shifter and the double-output gate in synchronism with equal time intervals in each state and selectively adjustable to change the lengths of the time intervals, and said phase shifter being of the type for delivering outputs in the two states that differ in phase by 45°.

3. The radar set defined in claim 2 wherein said phase shifter is a plus and minus 22.5° phase shifter and said state shifting means is a square wave generator delivering its output to said phase shifter and said double-output gate.

* * * * *